US008548796B2

(12) United States Patent
Stymne et al.

(10) Patent No.: US 8,548,796 B2
(45) Date of Patent: Oct. 1, 2013

(54) STATISTICAL MACHINE TRANSLATION SYSTEM AND METHOD FOR TRANSLATION OF TEXT INTO LANGUAGES WHICH PRODUCE CLOSED COMPOUND WORDS

(75) Inventors: Sara Stymne, Linköping (SE); Nicola Cancedda, Grenoble (FR); Tamás Gaál, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 412 days.

(21) Appl. No.: 12/690,504

(22) Filed: Jan. 20, 2010

(65) Prior Publication Data

US 2011/0178791 A1  Jul. 21, 2011

(51) Int. Cl.
*G06F 17/28* (2006.01)

(52) U.S. Cl.
USPC ........................................ 704/4; 704/2; 704/9

(58) Field of Classification Search
USPC ........................................................ 704/2, 4, 9
See application file for complete search history.

(56) References Cited

U.S. PATENT DOCUMENTS

| | | | | |
|---|---|---|---|---|
| 4,706,212 | A * | 11/1987 | Toma | 704/2 |
| 6,182,026 | B1 | 1/2001 | Tillmann et al. | |
| 6,917,936 | B2 | 7/2005 | Cancedda | |
| 7,711,545 | B2 * | 5/2010 | Koehn | 704/5 |
| 8,126,698 | B2 * | 2/2012 | Washizawa et al. | 704/2 |
| 8,180,624 | B2 * | 5/2012 | Moore | 704/4 |
| 2004/0024581 | A1 | 2/2004 | Koehn et al. | |
| 2004/0030551 | A1 | 2/2004 | Marcu et al. | |
| 2005/0033565 | A1 * | 2/2005 | Koehn | 704/5 |
| 2005/0137854 | A1 | 6/2005 | Cancedda et al. | |
| 2006/0190241 | A1 | 8/2006 | Goutte et al. | |
| 2007/0150257 | A1 | 6/2007 | Cancedda et al. | |
| 2007/0265825 | A1 | 11/2007 | Cancedda et al. | |
| 2008/0262826 | A1 | 10/2008 | Pacull | |
| 2008/0300857 | A1 * | 12/2008 | Barbaiani et al. | 704/4 |
| 2009/0175545 | A1 | 7/2009 | Cancedda et al. | |

OTHER PUBLICATIONS

Stymne. "Definite noun phrases in statistical machine translation into Danish". In Proceedings of the Workshop on Extracting and Using Constructions in NLP, May 2009, Denmark, pp. 1-6.*
Popovic et al. "Statistical Machine Translation of German Compound Words." Advances in Natural Language Processing, 2006, pp. 1-9.*

(Continued)

*Primary Examiner* — James Wozniak

(74) *Attorney, Agent, or Firm* — Fay Sharpe LLP

(57) ABSTRACT

A translation system and method for translating source text from a first language to target text in a second language are disclosed. A library of bi-phrases is accessed to retrieve bi-phrases which each match a part of the source text. Each of the bi-phrases includes respective text fragments from the first and second language. Words of some (or all) of the bi-phrases are tagged with restricted part of speech (RPOS) tags. At least one of the RPOS tags is configured for identifying a word from the second language as being one which also forms a part of a closed compound word in the library. At least one target hypothesis is generated from the bi-phrases, which includes text fragments in the second language. The target hypothesis or hypotheses are evaluated, based at least in part on combinations of the restricted part of speech tags. Based on the evaluation, one of the at least one target hypothesis is output as the optimal hypothesis for forming the translation.

23 Claims, 4 Drawing Sheets

(56) References Cited

OTHER PUBLICATIONS

Stymne. "Compound processing for phrase-based statistical machine translation". Licentiate thesis,Linkoping University, Sweden, Dec. 2009, pp. 1-64.*

Cattoni et al. "A web-based demonstrator of a multi-lingual phrase-based translation system". In Proceedings of the Eleventh Conference of the European Chapter of the Association for Computational Linguistics: Demonstrations (EACL '06). Association for Computational Linguistics, 2006, Stroudsburg, PA, pp. 91-94.*

Holmqvist, et al. "Improving alignment for SMT by reordering and augmenting the training corpus," *Proceedings of the Fourth Workshop on Statistical Machine Translation*, Mar. 30-31, 2009.

Pedersen, B. "Using shallow linguistic analysis to improve search on Danish compounds," *Natural Language Engineering*, vol. 13, Issue 1, Mar. 2007 (Abstract Only).

Stymne, S. "A Comparison of Merging Strategies for Translation of German Compounds" *Proceedings of the EACL 2009 Student Research Workshop*, Apr. 2, 2009.

Stymne, et al. "Effects of Morphological Analysis in Translation between German and English" *Proceedings of the Third Workshop on Statistical Machine Translation*, Jun. 2008.

Stymne, et al. "Processing of Swedish Compounds for Phrase-Based Statistical Machine Translation" $12^{th}$ EAMT Conference, Sep. 22-23, 2008.

Schiller, A. "German compound analysis with wfsc," *Fifth International Workshop, FSMNLP*, 2005.

Stymne, S. "German Compounds in Factored Statistical Machine Translation," *Proceedings of the 6th International Conference on Advances in Natural Language Processing*, Aug. 25-27, 2008.

Koehn, et al. "Empirical Methods for Compound Splitting," *Proceedings of the Tenth Conference of European Chapter of the Association for Computational Linguistics*, vol. 1, pp. 187-193, Apr. 12-17, 2003.

NIEβEN, et al. "Improving SMT Quality with morpho-syntactic analysis," *International Conference on Computational Linguistics, Proceedings of the 18th conference on Computational linguistics*, vol. 2, pp. 1081-1085, Jul. 31-Aug. 4, 2000.

Papineni, et al. "Bleu: a Method for Automatic Evaluation of Machine Translation," *Proceedings of the $40^{th}$ Annual Meeting of the Association for Computational Linguistics* (ACL), pp. 311-318, Jul. 2002.

Fraser, A. "Experiments in morphosyntactic processing for translating to and from German," *Proceedings of the Fourth Workshop on Statistical Machine Translation*, pp. 115-119, Mar. 30-31, 2009.

Koehn, et al. "Towards better Machine Translation Quality for the German-English Language Pairs," *Proceedings of the Third Workshop on Statistical Machine Translation*, pp. 39-142, Jun. 2008.

Koehn, et al. "Factored Translation Models," *Proceedings of the 2007 Joint Conference on Empirical Methods in Natural Language Processing and Computational Natural Language Learning*, pp. 868-876, Jun. 2007.

Koehn, et al. "Moses: Open Source Toolkit for Statistical Machine Translation," *Proceedings of the ACL 2007 Demo and Poster Sessions*, pp. 177-180, Jun. 2007.

Holmqvist, et al. "Getting to know Moses: Initial experiments on German-English factored translation," *Proceedings of the $2^{nd}$ Workshop on Statistical Machine Translation*, pp. 181-184, Jun. 2007.

U.S. Appl. No. 12/404,412, Faddoul, et al.

U.S. Appl. No. 12/427,149, Tomeh, et al.

Virpioja, et al. "Morphology-Aware Statistical Machine Translation Based on Morphs Induced in an Unsupervised Manner," *Proceedings of the Machine Translation Summit XI*, pp. 491-498. Sep. 14-19, 2007.

Simard, et al. "Translating with non-contiguous phrases," *Proceedings of Human Language Technology Conference and Conference on Empirical Methods in Natural Language Processing (HLP/EMNLP)*, pp. 755-762, Oct. 2005.

Tillman, et al. "Accelerated DP Based Search for Statistical Translation," *Proceedings of European Conference on Speech Communication and Technology*, 1997.

Popovic, et al. "Statistical Machine Translation of German Compound Words," Lecture Notes in Computer Science, vol. 4139, 2006.

Doddington, G. "Automatic Evaluation of Machine Translation Quality Using N-gram Co-Occurrence Statistics," *Proceedings of the Second International Conference on Human Language Technology Research*, pp. 138-145, Mar. 24-27, 2002.

Langer, S. Zur Morphologie und Semantik von Nominalkomposita, *Tagungsband der 4. Konferenz zur Verabeitung natürlicher Sprache (KON-VENS)* 1998 (Abstract Only).

* cited by examiner

STATISTICAL MACHINE TRANSLATION SYSTEM AND METHOD FOR TRANSLATION OF TEXT INTO LANGUAGES WHICH PRODUCE CLOSED COMPOUND WORDS

BACKGROUND

The present exemplary embodiment is directed to the field of machine translation. It finds particular application in the translation of text into a language which produces compound words.

In several natural languages, including most of the Germanic (e.g., German, Danish, and Swedish), Uralic (e.g., Finnish and Hungarian) and Dravidian (e.g., Tamil and Telugu and other languages, mainly spoken in parts of India, Sri Lanka, Pakistan, Bangladesh, Afghanistan, and Iran) language families, so-called closed compounds are used. Closed compounds are written as single words without spaces or other inter-word boundaries. This is generally not the case in English, where open compounds are used, that is, compound parts are normally written as separate words. In closed compound languages, compounding is generally productive, which means that speakers routinely invent closed compound words when using the language. While some common closed compound words do find their way into dictionaries, the vast majority does not, and such compounds are simply interpreted by the reader by decomposing and analyzing them on the fly.

For example, an accepted translation of the phrase "knowledge of foreign languages" from English to German is a single word, Fremdsprachenkenntnisse. This is a closed compound formed by concatenation of three parts: fremd, sprachen and kenntnisse, which are all existing words in the German language (or may be slight modifications of existing words in some cases). The last part of the compound (kenntnisse in this example), is referred to herein as the "head" of the compound word, since it is the part which gives the compound its main meaning. The other parts of the compound modify the head or, where there are more than two parts, may modify one of the other parts.

Phrase-based statistical machine translation (SMT) techniques have been developed for translation between languages. The bi-phrases on which they operate are often harvested automatically from large collections of previously translated texts ("bilingual parallel corpora"), and stored in a database. One part of each bi-phrase is taken from the source text and the other from the target text. These bi-phrases employ multi-word expressions as well as single words. When given a new segment of text to translate, the translation system searches the database to extract all relevant bi-phrases, i.e., items in the database whose source-language phrase matches some portion of the new input. A subset of these matching bi-phrases is then searched for, such that each word of the input text is covered by exactly one bi-phrase in the subset, and that the combination of the target-language phrases produces a coherent translation. A probabilistic model is often used to find an optimal alignment between the source sentence and its translation.

Such SMT techniques tend to give poor results for languages with common and productive closed compounding, where new words can be and often are created from existing ones at will by concatenating them together. The existence of many of these compound words in the training corpus text is thus low, or they are not present at all. Methods have been developed for translating from such closed compound languages into other languages which involve first deconstructing the closed compounds and then applying phrase-based SMT techniques. However, to date, translations into such languages which provide closed compounds, when appropriate, have not been achieved.

INCORPORATION BY REFERENCE

The following references, the disclosures of which are incorporated herein in their entireties by reference, are mentioned:

Phrase based machine translation systems are disclosed, for example, in U.S. Pat. No. 6,182,026 entitled METHOD AND DEVICE FOR TRANSLATING A SOURCE TEXT INTO A TARGET USING MODELING AND DYNAMIC PROGRAMMING, by Tillmann, et al., U.S. Pub. No. 2004/0024581 entitled STATISTICAL MACHINE TRANSLATION, by Koehn, et al., U.S. Pub. No. 2004/0030551 entitled PHRASE TO PHRASE JOINT PROBABILITY MODEL FOR STATISTICAL MACHINE TRANSLATION, by Marcu, et al., U.S. Pub. No. 2008/0300857, published Dec. 4, 2008, entitled METHOD FOR ALIGNING SENTENCES AT THE WORD LEVEL ENFORCING SELECTIVE CONTIGUITY CONSTRAINTS, by Madalina Barbaiani, et al.; U.S. Pub. No. 2006/0190241, published Aug. 24, 2006, entitled APPARATUS AND METHODS FOR ALIGNING WORDS IN BILINGUAL SENTENCES, by Cyril Goutte, et al.; U.S. Pub. No. 2007/0150257, published Jun. 28, 2007, entitled MACHINE TRANSLATION USING NON-CONTIGUOUS FRAGMENTS OF TEXT, by Nicola Cancedda, et al.; and U.S. Pub. No. 2007/0265825, published Nov. 15, 2007, entitled MACHINE TRANSLATION USING ELASTIC CHUNKS, by Nicola Cancedda, et al.

Methods for building libraries of parallel corpora from which bilingual dictionaries can be generated are disclosed, for example, in U.S. application Ser. No. 11/789,089, filed Apr. 20, 2007, entitled METHOD FOR BUILDING PARALLEL CORPORA, by Francois Pacull; and U.S. patent application Ser. No. 12/427,149, filed on Apr. 21, 2009, entitled BI-PHRASE FILTERING FOR STATISTICAL MACHINE TRANSLATION, by Marc Dymetman, et al.

Methods for evaluating the quality of machine translation are disclosed, for example, in U.S. Pub. No. 2005/0137854, published Jun. 23, 2005, entitled METHOD AND APPARATUS FOR EVALUATING MACHINE TRANSLATION QUALITY, by Nicola Cancedda, et al., and U.S. Pat. No. 6,917,936, issued Jul. 12, 2005, entitled METHOD AND APPARATUS FOR MEASURING SIMILARITY BETWEEN DOCUMENTS, by Nicola Cancedda; and U.S. Pub. No. 2009/0175545, published Jul. 9, 2009, entitled METHOD FOR COMPUTING SIMILARITY BETWEEN TEXT SPANS USING FACTORED WORD SEQUENCE KERNELS, by Nicola Cancedda, et al.

BRIEF DESCRIPTION

In accordance with one aspect of the exemplary embodiment, a machine translation method for translating source text from a first language to target text in a second language is provided. The method includes receiving the source text in the first language. A library of bi-phrases is accessed. Each of the bi-phrases includes a text fragment from the first language and a text fragment from the second language. At least some of the bi-phrases comprise words which are tagged with restricted part of speech tags. At least one of the restricted part of speech tags is configured for identifying a word from the second language as being one which also forms a part of a known closed compound word. The method further includes retrieving text fragments in the second language from the library corresponding to text fragments in the source text and generating at least one target hypothesis. Each of the target hypotheses includes text fragments selected from the second language. The target hypothesis or hypotheses are evaluated, based at least in part on combinations of the restricted part of speech tags. Based on the evaluation, one of the at least one target hypothesis is output as the optimal hypothesis for forming the translation. One or more of the accessing, retrieving, evaluating and outputting may be performed with a computer processor.

In another aspect, a machine translation system for translating source text from a first language to target text in a second language is provided. The system includes computer-accessible memory which stores a library of bi-phrases, each of the bi-phrases including a text fragment from the first language and a text fragment from the second language. At least some of the bi-phrases are tagged with restricted part of speech tags. At least one of the restricted part of speech tags are configured for identifying a text fragment from the second language as being one which also forms a part of a known closed compound word. A processor executes instructions stored in memory for retrieving text fragments from the second language from the library corresponding to text fragments in the source text, generating at least one target hypothesis, each of said target hypotheses comprising text fragments selected from the retrieved fragments in the second language, and evaluating the hypothesis with a translation scoring function which scores the hypothesis according to a plurality of features, at least one of the features comprising a feature which favors hypotheses comprising consecutive text fragments with restricted part of speech tags which indicate that the consecutive text fragments are ordered for forming a closed compound word, and based on the evaluation, outputting a translation based on one of the hypotheses.

In another aspect, a machine translation method for translating source text from a first language to target text in a second language is provided. The method includes receiving the source text in the first language. A library of bi-phrases is accessed. Each of the bi-phrases includes a text fragment from the first language and a text fragment from the second language. At least some of the bi-phrases are tagged with restricted part of speech tags. The restricted part of speech tags include an NP tag which identifies a text fragment from the second language as being one which also forms a part of a known closed noun compound word other than in a head position of the closed noun compound word and an N tag which identifies at least one of a text fragment which appears in a closed noun compound word in the head position and another noun. Text fragments from the second language are retrieved from the library corresponding to text fragments in the source text. At least one target hypothesis is generated. Each of the target hypotheses includes text fragments selected from the second language. The at least one target hypothesis is evaluated, based at least in part on combinations of restricted part of speech tags. The evaluating includes at least one of: a) counting at least one of i) occurrences of combinations of NP-N and NP-NP which favor formation of closed compound words and ii) occurrences of NP immediately followed by a restricted part of speech tag other than N or NP, which disfavor formation of closed compound words, and b) retrieving conditional probabilities of occurrence for subsequences of restricted part of speech tags in the target hypothesis and computing a combined probability based thereon. Based on the evaluation, one of the at least one target hypothesis is output as the optimal hypothesis for forming the translation.

DETAILED DESCRIPTION

Figure 1:
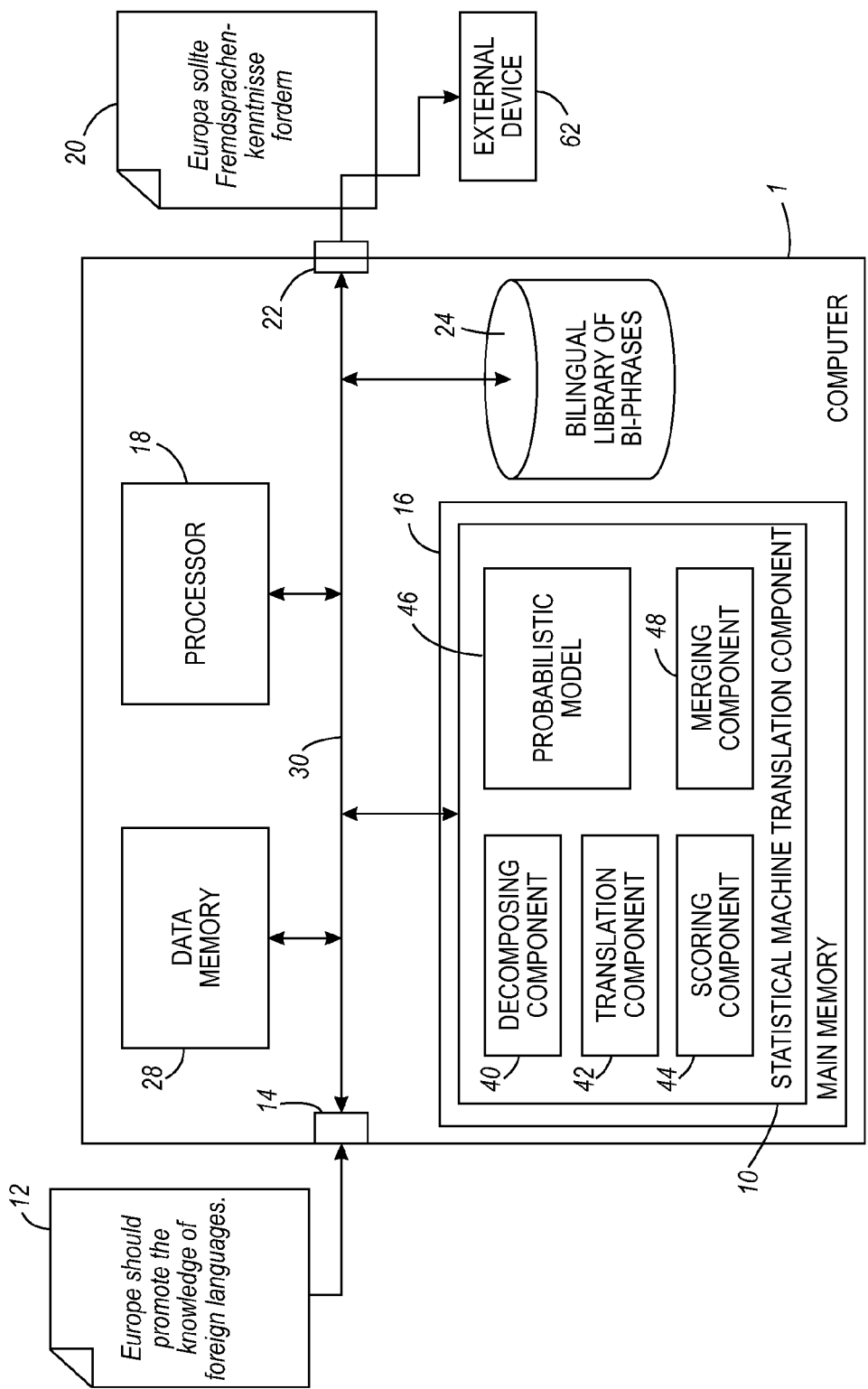
FIG. 1 is a functional block diagram illustrating an apparatus which hosts a system for statistical machine translation suitable for use for translation of source text into a compounding target language.

The exemplary embodiment relates to a system and method for phrase-based statistical machine translation. The system takes, as input, text, (which can be considered as a sequence of tokens), in a first natural language (the source language), and outputs a translation in a second, different, natural language (target language). At least the target language (and optionally also the source language) is a compounding language, i.e., one in which closed compound words are used. Each closed compound word (which may be referred to herein simply as a "closed compound") is a combination of two or more accepted words in the language or otherwise derived therefrom ("compoundable words"). The closed compound is generally formed by removing spaces between the compoundable words or spacing only with a hyphen, although in some cases, additional rules are applied in creation of the closed compound.

Some examples of closed compounds, exemplified in German, with their English translations, are shown below.

a) Regierungskonferenz=intergovernmental conference
b) Fremdsprachenkenntnisse=knowledge of foreign languages
c) See-und Binnenhäfen=sea and inland ports
d) Kosovo-Konflikt=Kosovo conflict
e) Völkermord=genocide As can be seen from these examples, compound words can be binary, i.e., made up of two parts (a), or have more than two parts (b). There are also coordinated compound constructions (c). In a few cases, compounds are written with a hyphen, often when one of the parts is a proper name or an abbreviation (d). A closed compound in one language does not necessarily correspond to a closed compound in another language. German closed compounds can have English translations that are open compounds (a), other constructions, possibly with inserted function words and reordering (b), or single words (e). While all of the above are examples of compound nouns, compound adjectives or compound verbs are also used in some compounding languages.

Compound parts sometimes have special compound forms, formed by additions or truncations of letters, by use of an umlaut or by a combination of these, as in (a), where the letter -s is added to the first part, Regierung. These forms sometimes coincide with paradigmatic forms, as in (e), where Völker is the plural form of Volk. Sometimes they are unique forms, as in (a), where the part Regierungs is only used in closed compounds. For an overview of German compound forms, see Stefan Langer, Zur Morphologie und Semantik von Nominalkomposita, in *Tagungsband der* 4. *Konferenz zur Verarbeitung natürlicher Sprache* (KONVENS), pp. 83-97, Bonn, Germany (1998), and for Swedish, see Stymne, Sara & Holmqvist, Maria, Processing of Swedish compounds for phrase-based statistical machine translation, in *Proc. European Machine Translation Conf.*, pp. 180-189, Hamburg, Germany (2008).

The term "bi-phrase," as used herein, refers to a source language-target language pair of "phrases" or "text fragments" which are mutual translations of each other. Each phrase can be a single word or several words. Bi-phrases can also contain gaps, each gap corresponding to one or more unspecified words (see, for example, above-mentioned published application Nos. 2007/0265825 and 2005/0137854, incorporated by reference). In the exemplary application, at least some of the bi-phrases contain compoundable words on the target side. A "compoundable word," as used herein, is a word which, when combined with at least one other compoundable word and application of specified compounding rules, forms a closed compound word. The method and apparatus rely on the creation of a library (database) of such bi-phrases with compoundable words appropriately labeled with restricted part of speech (RPOS) tags, as described in detail below. This allows the merging of compoundable words into new closed compounds, i.e., those which do not already exist in the bi-phrase library.

The exemplary apparatus and method can improve translation scores (such as NIST and BLEU scores) when translating into a compounding language. Conventional methods for translation into a compounding language often result in fewer closed compounds than in normal texts. This can be due to the fact that the desired closed compounds are missing in the training data, or that their parts have not been aligned correctly. Where a closed compound is the idiomatic word choice in the translation, an existing machine system can instead produce separate words, genitive or other alternative constructions, or only translate one part of the closed compound.

The present method is particularly useful in productive closed compound languages since it enables closed compounds that have never been seen in the training data to be processed correctly, where one or more of their component parts have been observed, but within a different closed compound.

Figure 2:
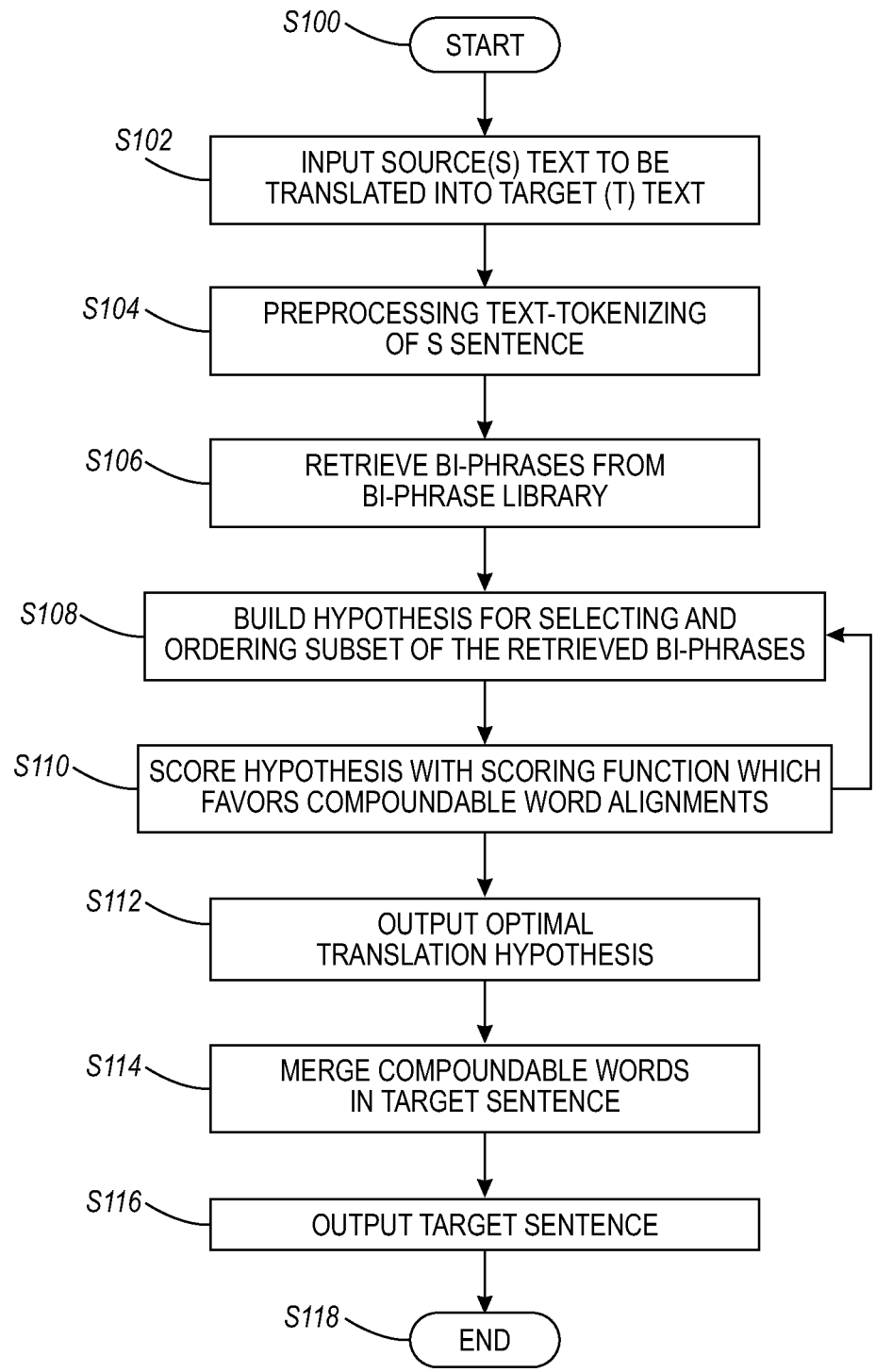
FIG. 2 is a flow diagram of a method for statistical machine translation which accommodates compounding in the target language.

FIG. 1 is a functional block diagram illustrating an exemplary apparatus 1 which hosts an automated natural language translation system 10 for performing phrase-based statistical machine translation. In particular, the system 10 may be used for performing a method as shown in FIG. 2.

Text 12 in a source natural language is input to the apparatus 1 via an input device 14. Input text 12 may be directly input into the natural language translation system 10 (for example, as with a person typing sentences into a computer using a keyboard). Alternatively, input text 12 may be the output of another system, such as, for example, output from a speech recognition system (for example, a speech input device coupled with a speech-to-text converter) or from an optical character recognition system (not shown). Or, the text may be input from a database or word document. The text 12 may include one or more sentences, such as a paragraph or an entire document comprising multiple paragraphs, each sentence being made up of a sequence of tokens, such as words.

The translation system 10 may be in the form of hardware, software, or a combination thereof. In the exemplary embodiment, the translation system 10 is in the form of software instructions stored in main memory 16 of apparatus 1, which are executed by an associated processor 18. The instructions stored in memory 16 generate a translation 20 of the input text 12 in a target language (a compounding language). Translated text 20 is output from the system 10 via an output device 22, which may be the same or separate from the input device 14.

A bilingual library 24 storing bi-phrases is stored in memory accessible to the processor 18 (such as memory 16 or a separate memory). Data memory 28 stores the input text 12 during processing. Components 14, 16, 18, 22, 24, 28 of the apparatus 1 are communicatively linked by wired or wireless links, such as a data control bus 30.

The digital processor 18 can be variously embodied, such as by a single-core processor, a dual-core processor (or more generally by a multiple-core processor), a digital processor and cooperating math coprocessor, a digital controller, or the like. The digital processor 18, in addition to controlling the operation of the computer, executes instructions stored in memory 16 for performing the method outlined in FIG. 2.

In the illustrated embodiment, the machine translation system 10 includes various software components for translation of the input text. As will be appreciated, the components may be separate or combined, and/or additional components may be provided. A decomposition component 40 is used in the generation of the bilingual library 24 and decomposes closed compounds in the target language and labels their component parts. These labeled compoundable words are stored in the bilingual library 24. In the exemplary embodiment, the decomposition and labeling is performed prior to performing translations and thus component 40 need not be present at the translation performing stage. The same or a separate source language-specific decomposition component may, however, be used during translation for decomposing any closed compounds in the input text into their component parts.

A translation component or decoder 42 retrieves bi-phrases from the library to cover words/phrases in each source text string. Working on a string of contiguous words in the source language, such as a sentence of the input text, the translation component 42 accesses the library 24 to retrieve bi-phrases which each include a phrase in the target language corresponding to a phrase in the source language text string. A scoring component 44 evaluates partial and/or full translation hypotheses to identify probable translations of the input text string. The exemplary scoring component utilizes a probabilistic model 46 to identify an optimal selection and ordering of target phrases, based on the identified bi-phrases and features of the words. In the exemplary embodiment, a target hypothesis is evaluated with a translation scoring function which scores the target hypothesis according to a plurality of feature functions. At least one of the feature functions is based on a restricted set of part-of-speech (POS) tags of compoundable words. A merging component 48 serves to merge compoundable words in the translated target text.

An exemplary decoder which may be used herein is the Matrax™ decoder of Simard, et al. (Simard, Michel; Nicola Cancedda; Bruno Cavestro; Marc Dymetman; Eric Gaussier; Cyril Goutte; Kenji Yamada; Philippe Langlais and Arne Mauser, Translating with non-contiguous phrases, in Proc. Conf. on Human Language Technology and Empirical Methods in Natural Language Processing, pp. 755-762, Vancouver, British Columbia, Canada (2005)). The Matrax™ decoder allows non-contiguous bi-phrases, such as jeopardize— bringe . . . i fare (literally, bring . . . into danger), where words in the source, target, or both sides can be separated by gaps that have to be filled by other phrases at translation time. Other phrase-based decoders, which can only handle phrases that are contiguous, may alternatively be used. Optionally, text content within brackets may be translated separately, in order to avoid reordering that crosses brackets, e.g., processed according to the method outlined in U.S. Ser. No. 12/404,412, filed Mar. 16, 2009, entitled METHOD TO PRESERVE THE PLACE OF PARENTHESES AND TAGS IN STATISTICAL MACHINE TRANSLATION SYSTEMS, by Jean-Baptiste Faddoul, et al., the disclosure of which is incorporated herein in its entirety by reference.

A version of the Matrax™ decoder which is modified to handle factors on the output side allows a restricted part-of-speech set to be used as an output factor.

Other decoders that can use factors can be used, such as that described by Koehn, Philipp; Hieu Hoang; Alexandra Birch; Chris Callison-Burch; Marcello Federico; Nicola Bertoldi; Brooke Cowan; Wade Shen; Christine Moran; Richard Zens; Chris Dyer; Ondrej Bojar; Alexandra Constantin and Evan Herbst, Moses: open source toolkit for statistical machine translation, in Proc. 45th Annual Meeting of the ACL, demonstration session, pp. 177-180, Prague, Czech Republic (2007).

In the bilingual library 24, closed compounds may be stored in their compound form, as well as decomposed into their corresponding compound parts. Thus, a bi-phrase in the library which includes a target language phrase which is a compoundable word may be found in combination with one or more other compoundable target words in at least one bi-phrase containing a target language closed compound in the library. The compound parts, each part correspond to a compoundable word in the library, are stored together with any predefined rules for forming a closed compound word therefrom. The compound parts are tagged with restricted part-of-speech (RPOS) tags to indicate that they are compoundable words that are present in at least one closed compound word in the library.

Figure 3:
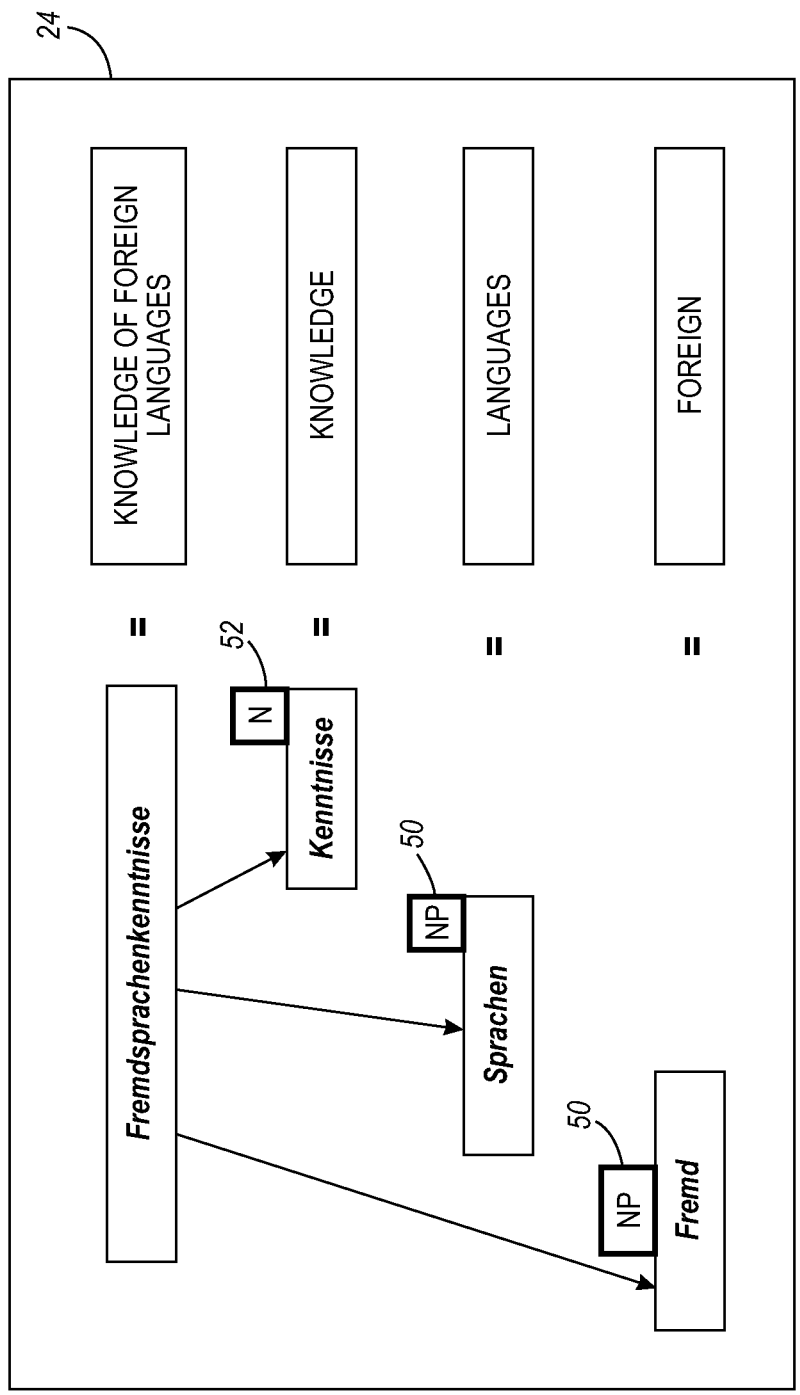
FIG. 3 illustrates the labeling of compound word parts as compoundable words.
Figure 4:
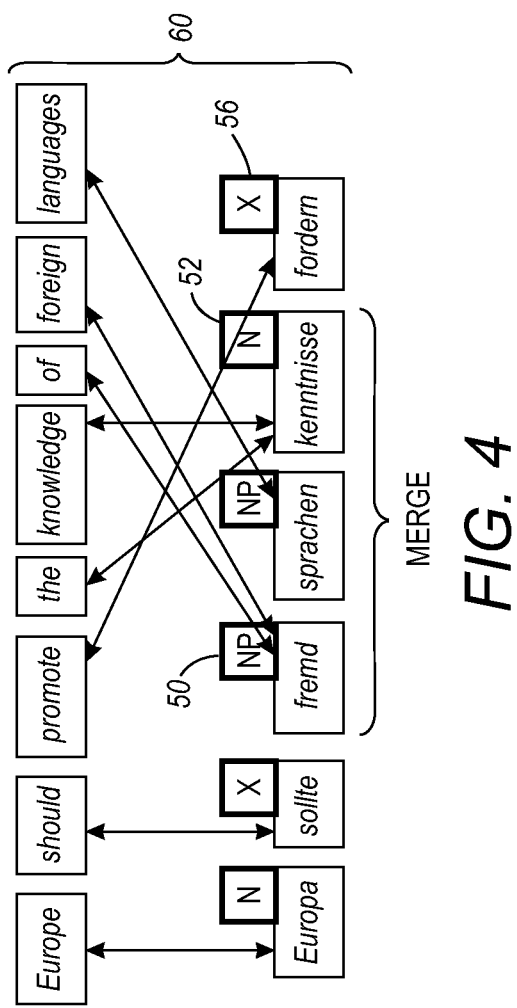
FIG. 4 illustrates an alignment between a source (English) sentence and a target (German) sentence in which compoundable word parts precede a possible head in the target sentence.

Thus, for example, as shown in FIG. 3, the bi-phrase library could contain the entries <foreign,(fremd,NP)>, <languages, (sprachen,NP)>, <knowledge,(kenntnisse,N)> and <knowledge of foreign languages,(Fremdsprachenkenntnisse,N)>. The word fremdsprachenkenntnisse may optionally be tagged with fremd, sprachen, and kenntnisse. Each of these parts is also tagged with a restricted POS (RPOS) tag 50, 52 which identifies at least the first two of them as compoundable words. These RPOS tags are illustrated in FIG. 2 as being of two types, NP (compound parts, other than heads) and N (heads and all other nouns), although it is to be appreciated that the tags may be probabilistic in nature where a compoundable word is found to exist as more than one type. In this example, other words are tagged with an X RPOS tag 56 (FIG. 4), although as explained below, verbal and adjectival types of compound may be provided with respective RPOS tag. In generating an alignment, the RPOS tags are retrieved. For example, when the bi-phrase <languages, (sprachen, NP)> is retrieved as a possible translation for part of an English source text which includes the word "languages", such as "knowledge of the Gaelic languages," the restricted POS tag enables the system 10 to consider sprachen as a potential part of a closed compound word and the translation system favors positioning it immediately prior to a suitable head.

It will be appreciated that a source string may be translated as multiple different target strings where multiple alternative bi-phrases exist. The exemplary translation system 10 may employ a log-linear statistical translation model 46 for identifying statistically probable translations. Such models use probability functions to identify a target language string with maximum probability, i.e., a string which optimizes one or more functions which model statistically probable translations. In the exemplary embodiment, the model uses a log linear model in which at least one of the functions is dependent on the presence of restricted POS tags of compoundable words and optionally a set of ordering rules, favoring orderings in which one or more compoundable words (e.g. labeled NP) are directly adjacent to each other in the target hypothesis with a compoundable word (e.g., labeled N) in a head position.

The scoring component 44 scores partial and/or full translation hypotheses to identify probable translations of the text string.

The output device 22 may be in communication with one or more rendering devices (not shown) such as one or more of a visual display device (such as a monitor with a screen), a hard copy device (such as a printer), and an audible output device (such as, for example, an audio speaker). Translated strings of text and the entire text, once translated, may be stored in volatile or non-volatile memory 28.

The system 10 may be instantiated in one or more specific or general purpose computers, such as a personal computer, server computer, PDA, or dedicated computing device.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Memory 16, 28 may include, for example, read only memory (ROM), random access memory (RAM), flash memory, or any combination of the above as a single component or distributed components. Alternatively, the processor 18 accesses a remote database which stores the bi-phrase library, for example, via the internet or via a network link.

It will be appreciated that computer 1 may be controlled by operating system software which includes a file management system, such as, for example, a disk operating system, which is part of the operating system software. The file management system may be stored in a non-volatile memory storage device, such as memory 16 and may be configured to cause processor 18 to execute the various functions required by the operating system to input and output data and to store data in volatile memory 28.

The digital processor 18 can be variously embodied, such as by a single-core processor, a dual-core processor (or more generally by a multiple-core processor), a digital processor and cooperating math coprocessor, a digital controller, or the like. The digital processor 18, in addition to controlling the operation of the computer 1, executes instructions stored in memory 28 for performing the method outlined in FIG. 2.

The exemplary scoring component 44 includes instructions for computing a plurality of feature functions which are combined into a log linear scoring function. In various embodiments, two (or more) of these feature functions may be combined into a single feature function.

FIG. 2 illustrates an exemplary translation method. The method assumes the creation and storage of an accessible bi-phrase library 24 in which RPOS tags are associated with at least the compound parts of split closed compounds. The method begins at S100.

At S102, source text 12 to be translated is input and stored in memory. The source text 12 comprises one or more sequences (e.g., sentences) of tokens (e.g., words).

At S104, the input text may be processed to identify the tokens in the sequence and optionally associate tags with the tokens, such as POS tags. In addition, digits and units may be replaced with placeholders, which are replaced after translation by the corresponding digits and units from the source.

At S106, a set of bi-phrases are retrieved from the bi-phrase library, each bi-phrase covering at least one of the tokens in the source text sequence.

At S108, a hypothesis (possible alignment) is built for aligning a set of the bi-phrases to produce a target sequence.

At S110, the hypothesis is scored with the scoring function by applying the log linear model which includes feature functions related to ordering of compoundable words. Steps S108 and S110 may be iterated several times until a translation in which every word of the source sequence is covered by a single bi-phrase and optimizes the log linear model is achieved, e.g., by progressively extending, scoring and eliminating translation candidates until an optimal translation is achieved. As will be appreciated, the term "optimization" is used in a relative sense as it may not be practical to consider every possible orderings of all possible combinations of bi-phrases which cover source words. The optimal translation is thus the translation 60 (see, e.g., FIG. 4) which provides the highest probability score of those tested with the model and is output at S112.

At S114, a merging strategy, based on the POS, is applied to construct the final translation with closed compounds. In general, this includes merging two or more consecutive compoundable words (e.g., type NP) with a head (e.g., type N) which meet any specific merging rules. As will be appreciated, if no mergeable compoundable words are found, no closed compounds will be created.

At S116, the translation 20, including compound words, if appropriate, is output, e.g., to memory 28 or to an external device 62, such as a display, printer, external memory storage device, or the like.

The method ends at S118.

The method illustrated in FIG. 2 may be implemented in a computer program product that may be executed on a computer. The computer program product may be a tangible computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. Alternatively, the method may be implemented in a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the translation method.

Where closed compounds are found in both the source and the target languages, the method can further include steps for dealing with source language closed compounds (as well as those on the target side), which may include splitting closed compounds on the source side of the training corpus, and learning a translation model from this split training corpus from the decomposed-source into the target language. At translation time, closed compounds in the source segment to be translated are split using the same method adopted for splitting closed compounds in the training set and the source text translated using the learned model from decomposed-source into the target language which uses the restricted POS tags to provide an alignment which favors generating closed compounds, as described above. A post-processing merging step can be used to construct the closed compounds by merging the compoundable words.

The exemplary method assumes a SMT system with a pre-processing step of training, where closed compounds are split in their component parts. The compound parts are tagged with RPOS tags, and a post-processing step after translation, where the compound parts are merged into full compounds. Any method for splitting and merging compound parts can be used. It is also possible to use markup and/or normalization of compound parts arbitrarily, as long as the merging method is suitable.

The merging step is designed to identify which words should be merged into closed compounds, and choose the correct form of the compound parts. Having an alignment in which the compoundable words are placed side by side and in the correct order, as in the present method, facilitates the merging step.

Consider, for example, translating the following English sentence into German:

Europe should promote the knowledge of foreign languages.

Assuming that the training corpus (and thus, the bi-phrase library) did not contain occurrences of the pair ("knowledge of foreign languages", "fremdsprachenkenntnisse") but contained occurrences of ("'knowledge", "kenntnisse"), ("foreign", "fremd") and ("languages", "sprachen") each with restricted POS tags identifying them as compoundable words and identifying kenntnisse as a possible head, then the exemplary translation model from English into decomposed-German may be able to produce:

Europa sollte fremd sprachen kenntnisse fördern

In this case a good merging heuristic should be able to reconstruct the correct German:

Europa sollte fremdsprachenkenntnisse fördern

In contrast, with a conventional translation method, where the sentence may be translated into decomposed-German compoundable words in the wrong order, as in:

Europa sollte sprachen fremd kenntnisse fördern

Or, the compoundable words may not be placed adjacent to one another, as in:

Europa sprachen sollte fremd kenntnisse fördern

In both these cases, the chances that any conventional merging heuristic will succeed in reconstructing the correct translation are substantially reduced.

Statistical Machine Translation

The exemplary statistical machine translation system may model the conditional probability p of a target sentence e (and a hidden alignment variable a) given a source sentence f as a log-linear model:

$$p(e, a \mid f) = \frac{1}{Z_f} e^{\sum_{i=1}^{n} \lambda_i h_i(e,a,f)} \qquad (1)$$

where the $h_i$'s are feature functions and provide information on aspects that can help distinguish between a good and a bad translation, and the $\lambda_i$'s are feature weights which weight the importance of the respective feature. The weights can be tuned to optimize the translation model. Each of the feature functions effectively scores a particular aspect of the relationship between the source and target sentence where the contribution of each feature function is determined by the corresponding model parameter $\lambda_i$ and $Z_f$ is a normalization constant. Such feature functions may include various estimates of conditional probabilities of the source given the target and vice-versa, priors on the amount of word reordering between the source and its translation, or on the difference in length, as well as one or more feature functions which promotes closed compound formation. An alignment a represents a division of the source and target sentences into bi-phrases found in the bi-phrase library. The weights $\lambda_i$ can be tuned (learned) in a training phase.

Translation is then performed by searching over the space of all (or a sizeable number of) possible target language sentences for the one optimizing the conditional probability, given the source sentence, as estimated by the model above.

In one embodiment, one or more of the feature functions $h_i$ is aimed at promoting closed compound formation by favoring alignments in which compoundable words are positioned adjacent to each other and compoundable words which are not classed as heads are not placed at the end of a sentence. In another exemplary embodiment, the exemplary log-linear model employs one or more language models as feature functions in which certain sequences are boosted and others are punished, as described in further detail below.

Restricted Part-of-Speech (RPOS)

A restricted part-of-speech set, targeted at compound translation, is used to label bi-phrases. This may be combined with the use of sequence models as soft constraints, or count features, in order either to boost or punish wanted or unwanted tag combinations. In the exemplary embodiment, each of the target word(s) in each bi-phrase stored in the library is tagged with an RPOS tag.

A consideration taken when designing this RPOS set is how different tokens can be used for combining words to form closed compounds. In the example below, only closed noun compounds (closed compounds which are nouns) are considered. However, closed compounds which are verbs, adverbs, and/or adjectives may also be considered where these are prevalent in the target language. As an example of a RPOS set designed to be able to model the order of noun compounds in the output, the following tags may be applied to target words in the bi-phrase library:

NP—all parts of a split compound except the last (e.g., fremd and sprachen in the case of the split compound, fremd sprachen kenntnisse)

N—the last part of the compound (the head), and all other nouns (e.g., kenntnisse in the case of the split compound, fremd sprachen kenntnisse)

X—all other tokens,

Optionally, a symbol may also be used to mark the end of sentences:

<\s>—end of sentence

As will be appreciated, this scheme enables boosting the formation of closed compounds, that is, compound parts following each other, and especially being followed by a possible head. In addition it enables punishing faulty sequences, such as a compound part NP followed by any other RPOS tag than N or NP, such as an X or <\s>.

The above scheme assumes that only closed noun compounds are treated but it can easily be extended to other types of closed compounds, for instance adjectives verbs, and adverbs, in addition to nouns, e.g., using the following RPOS set, wherein the pairs VP and V, AP and A, and AdP and Ad are all optional and may be used if the target language uses closed compound words that are verbs (closed verb compounds), adjectives (closed adjective compounds), and/or adverbs (closed adverb compounds):

NP—all parts of a split closed noun compound except the last

N—the last part of closed noun compounds, and all other nouns

VP—all parts of a split closed verb compound except the last

V—the last part of closed verb compounds, and all other verbs (optionally, excluding copulas, such as those including forms of the verb "to be")

AP—all parts of a split closed adjective compound except the last

A—the last part of closed adjective compounds, and all other adjectives

AdP—all parts of a split closed adverb compound except the last

Ad—the last part of closed adverb compounds, and all other adverbs

X—all other tokens (and optionally also < >—end of sentence)

Method 1: Sequence Models as Count Features

Using the restricted part-of-speech set, such as those described above, a sequence model can be trained, based on corpora occurrences. The sequence model effectively punishes the unseen events where a compound part is not followed by a suitable head. Such a sequence model, however, may tend to favor common non-closed compounds over closed compounds, since such constructions can be more common in text. In one embodiment, to remedy this, sequence models are used as count features. They can either punish bad combinations of RPOS, or boost good combinations. Table 1 gives an overview of the possible bigram combinations, using the three symbol tagset (NP, N and X), plus a sentence end marker, and their judgment as good, bad or neutral. In each combination, the tags are in sequence, i.e., the first RPOS tag of the combination occurs in the text sequence before the second RPOS tag.

TABLE 1

| Tag Sequence patterns | |
|---|---|
| Combination | Judgment |
| NP NP | Good (particularly if long closed compounds are to be favored) |
| NP N | Good |
| NP <\s> | Bad |
| NP X | Bad |
| all other combinations | Neutral |

A set of combinations of RPOS tags selected from the possible combinations of two (or more) combinations of RPOS tags for consecutive tokens is used by the sequence model(s).

A "punish" sequence model may be structured to punish the two bad combinations, i.e., where compound parts NP are placed in isolation, without a suitable head. A "boost" sequence model may be structured to favor the formation of closed compounds by rewarding the two good combinations. In particular, the boost model is structured to boost the combination of a compound part NP with a possible head N. In addition boosting the formation of long closed compounds, by boosting the combination of two compound parts, may be desirable, particularly where these are commonly used in the target language. These two boost combinations may be given different weights, to give the combination NP-N a greater impact.

In another embodiment, the N tag could be restricted to include only compound heads, i.e., excluding other nouns (which could be given a separate tag), thus allowing giving greater weight to nouns which are known to be used as heads.

In the exemplary embodiment, one or more sequence models or language models or other feature functions input into Eqn. 1 above may be employed which are based on a count of occurrences of good or bad patterns of two (or more) tokens made for a given alignment. Neutral combinations may be accorded a score of 0, which does not influence the score of the full sentence. Good and bad combinations are given values other than 0, which means that the final score for a sentence with good/bad combinations will be non-zero. In one embodiment, one or both of a boost model and a punish model, which considered different sets of patterns, are input to the translation model.

In one embodiment, both the punish and boost models have a negative count. In the full translation model, these can then be weighted with positive or negative λ weights for that feature function (see Equation 1). i.e., there can be a first feature function $h_p$ with a weight $\lambda_p$ for the punish model and a second feature function $h_b$ with a weight $\lambda_b$ for the boost model. In the training phase, the process that estimates the weight for all features in the log-linear model also learns the appropriate sign of the weight.

For example, the boost model may employ the count values shown in Table 2 and the punish model may employ the count values shown in Table 3. Note that the order in which the RPOS are shown in these tables corresponds to the order in which the words they are associated with are to be found in an aligned target sentence (i.e., NP-N≠N-NP). Also, it is to be appreciated that the values can be varied, especially for the boost model, where the combination of a compound part with a subsequent head NP-N could be given higher weight than the combination of two compound parts NP-NP.

TABLE 2

Exemplary count values for the boost model

| Combination | Value |
| --- | --- |
| NP NP | −1 |
| NP N | −1 |
| all other combinations | 0 |

TABLE 3

Exemplary count values for the punish model

| Combination | Value |
| --- | --- |
| NP <\s> | −1 |
| NP X | −1 |
| all other combinations | 0 |

The boost/punish sequence models can be used either in isolation, as a separate feature function, or the two models can be combined and used simultaneously in a single feature function. In either case, the number of each type of combination in the aligned sentence is counted, and a total score for the boost and punish models. Or in a combined model, the score is determined by multiplying the number of occurrences by the appropriate value. In another embodiment, only one of the two models may be used (e.g., just the boost model). The use of negative values in the boost and punish scores is not a requirement—alternatively they could be positive for boost and negative for punish, with the weights being learned to positively and negatively impact, respectively, the probability output by the scoring function.

For example, using the values in Tables 2 and 3 above, the alignment: Europa (N) sollte (X) fremd (NP) sprachen (NP) kenntnisse (N) fördern (X)<\s> may be scored as shown in Table 4:

TABLE 4

| Combination | Boost Value | Punish Value |
| --- | --- | --- |
| Europa (N) sollte (X) | 0 | 0 |
| sollte (X) fremd (NP) | 0 | 0 |
| fremd (NP) sprachen (NP) | −1 | 0 |
| sprachen (NP) kenntnisse (N) | −1 | 0 |
| kenntnisse (N) fördern (X) | 0 | 0 |
| fördern (X) <\s> | 0 | 0 |
| Total score | −2 | 0 |

The boost score −2 can be input as the feature $h_b$ in the log linear model. When given a negative weight $\lambda_b$, this favors the translation hypothesis.

Similarly, the punish score 0 can be input as the feature $h_p$ in the log linear model (Eqn. 1) and multiplied by its (negative) weight $\lambda_p$. The weights $\lambda_b$ and $\lambda_p$ can have different values. For example, in the learning phase, it may be determined that one bad combination has a detrimental effect which is greater than the positive effect of a good combination, in which case $\lambda_p$ may be greater than $\lambda_b$.

Alternatively, the boost and punish scores can be combined (e.g., boost score minus punish score), which in the Example gives a combined feature: $h_{(b-p)}=-2-0=-2$, which is multiplied by an appropriate weight $\lambda_{(b-p)}$ in the log linear model (Eqn. 1).

By comparison, the alignment:
Europa (N) sprachen (NP) sollte (X) fremd (NP) kenntnisse (N) fördern (X)<\s> would receive a boost score of −1 and a punish score of −1. Thus, this sentence would be less favored by the model when either separate boost and punish features or a combined boost and punish feature is used.

In this example, the second sentence would be less favored even if only a boost model is used, i.e., only one RPOS feature $h_b$ is used in the log linear model. However, in other cases, the addition of a punish feature, or a combined boost and punish feature, may provide additional discriminative power.

In this example, only scores for noun compounds are taken into account. It is to be appreciated that the boost/punish values for the corresponding combinations for verbs and/or adjectival compounds may also be considered in the total scores.

As will be appreciated, X may cover different words if adjectival phrases or verbal phrases are concerned, because, for example, AP followed by N is likely not a good combination for possible compounding. Or, additional combinations may be considered bad, and thus penalized in the scoring, such as NP-AP, NP-A, NP-VP, NP-V, and NP-X.

Another option is to generate a sequence model trained on data, either on the restricted tagset, or on a full tagset. A sequence model trained on data would differ from the boost/punish model in a number of ways. First, it would never have seen the unwanted combinations, so it would give them a very low probability assigned to unknown events by some smoothing method, which serves the same purpose as the punish model, but in a less controlled way. Second, the events desired to be boosted are considerably rarer than many other events, and closed compound formation would not be favored over other constructions.

Method 2: Language Models as Feature Functions

As an alternative or in addition to using the Sequence models and boost and punish features, described above, Language models (LMs) may be used as feature functions in Eqn 1. The exemplary LMs are estimated (log-) probability distributions log p(e) over the sentences of the target language, regardless of the source sentence.

As with common LMs, the LMs used in the exemplary embodiment make an k-order Markov assumption and decompose the probability of a target sentence $w_1^n$ (made up of n words) in terms of the product of the conditional probabilities of its words given only a few preceding words:

$$\log P(w_1^n) = \sum_{k=1}^{n} \log(P(w_k \mid W_{k-1})) \quad (2)$$

$P(w_k|W_{k-1})$ represents the probability of observing word $w_k$ of the target sentence immediately after the preceding word(s) $W_{k-1}$ in a translation corpus. Logarithms are used for computational ease. For example, the language model may be based on bigrams (each word is considered in the presence of only one preceding word) or trigrams (each word is considered in the presence of two preceding words). Thus, for a bigram model $W_{k-1}$ is just one word, except where $w_k$ is the first word in the sentence. For a trigram model, $W_{k-1}$ is the two preceding words to $w_k$, and so forth.

In the exemplary embodiment, rather than considering the words of the sentence, only their RPOS tags are considered in the Language Model. The same limited RPOS tagset described above can be used. Thus, the $P(w_k|W_{k-1})$ represents the probability of observing RPOS tag $w_k$ of the target sentence immediately after the preceding RPOS tag(s) for $W_{k-1}$ in a translation corpus. The system thus computes a probability of a given target hypothesis based on the conditional probabilities of the subsequences of its restricted part of speech tags, the conditional probabilities being determined for subsequences of a fixed length from a training corpus of text in the second language.

For example, in the tagged sentence:
Europa (N) sollte (X) fremd (NP) sprachen (NP) kenntnisse (N) fördern (X)<\s>
the language model would obtain the probabilities of finding the bigrams N-X, X-NP, NP-NP, NP-N, N-X, and X-<\s> in the same order in the training corpus (assuming a bigram model) and input the conditional probabilities into Eqn. 2 above to produce a value which can be used as a feature function in Eqn. 1. These individual conditional probabilities can be learned in the training stage. In another embodiment, a factored translation model is used, where other factors than the RPOS set can be considered, such as surface form, lemmas and/or part-of-speech. In a factored translation model, each token is represented by a tuple of factors. In the exemplary embodiment, the same RPOS tag set(s) as described above may be used in generating a factored translation model. Thus, the tuple may include the word's surface and/or lemma form and the appropriate RPOS tag and optionally one or more other features. e.g., surface form, lemma, part-of-speech, and morphological features. See, for example, Koehn, Philipp and Hieu Hoang Factored translation models, in Proc. Joint Conf. on Empirical Methods in Natural language Processing and Computational Natural Language Learning, pp. 868-876, Prague, Czech Republic (2007), hereinafter, Koehn 2007, for a description of how such factored translation models can be generated.

Merging Techniques

Merging rules applied at S114 may be of any suitable type. For example, the rules may concatenate the compoundable words (i.e., eliminating the white space), or in some merging rules, may place a hyphen between compoundable words. Other rules may require addition/removal of letters to certain compoundable words.

Various methods exist for merging compounding words which may be utilized herein. See, for example, Popovïc, et al., Statistical machine translation of German closed compound words, in Proc. of FinTAL—5th Intern'l Conf. on Natural Language Processing, pp. 616-624, Turku, Finland: Springer Verlag (2006), which describes merging techniques suited for translation into German. Stymne, et al., Processing of Swedish closed compounds for phrase-based statistical machine translation, in Proc. European Machine Translation Conference, pp. 180-189, Hamburg, Germany (2008), describes merging techniques suited for translation into Swedish. Stymne, Sara, A comparison of merging strategies for translation of German compounds, in Proc. of the Student Research Workshop at EACL 2009, pp. 61-69, Athens, Greece (2009), discloses several methods for merging compounds after translation into German in phrase based statistical machine translation systems. Although none of these methods disclose the RPOS tags used here, the rules for modifying compounding parts into the appropriate form for a closed compound, and other applicable merging rules, may be utilized herein.

The exemplary embodiment thus allows improvement in the placement of compound parts in the output of a PBSMT system where compounds are split by:

1) Using a RPOS set, targeted at the order of compound parts; and

2) Using sequence models or language models to implement count features, either to boost or punish wanted/unwanted combinations of tokens.

Without intending to limit the scope of the exemplary embodiment, the following example demonstrates the applicability of the exemplary system and method.

Example

An evaluation of translation from English into Danish on a corpus of automotive manuals, extracted from a translation memory was performed. Sentences longer than 55 words were filtered out. The size of the training corpus was 168,046 sentences, and an additional 1,000 sentences each were used for tuning of feature function weights and testing.

Results are reported on two standard metrics, NIST (see Doddington, George, Automatic evaluation of machine translation quality using n-gram co-occurrence statistics, in Proc. 2d Intern'l Conf. on Human Language Technology, pp. 228-231, San Diego, Calif. (2002)) and Bleu (see Papineni, et al., BLEU: a method for automatic evaluation of machine translation, in Proc. 40th Annual Meeting of the ACL, pp. 311-318, Philadelphia, Pa. (2002)), calculated on lower-cased data.

Different sequence models were used to compare the present method with other methods. For all sequence models, 3-grams were employed, although it is anticipated that the present method may work even better with sequence models of higher order, especially on the restricted part-of-speech set.

Closed compounds in the Danish training corpus were split before training using an empirical method based on Stymne, Sara German compounds in factored statistical machine translation, Aarne Ranta & Bengt Nordström, eds, Proc. of GoTAL—6th Intern'l Conf. on Natural Language Processing, pp. 464-475, Gothenburg, Sweden (2008): Springer Verlag, LNCS/LNAI. In this method, when compounds are split, the parts keep their form, which can be special to compounds, and no symbol is added.

Compound parts were merged after translation, using a method based on part-of-speech matching as discussed in Stymne, Sara, A comparison of merging strategies for translation of German compounds, in Proc. of the Student Research Workshop at EACL 2009, pp. 61-69, Athens, Greece. (2009).

As a decoder, the Matrax™ decoder of Simard, et al. was used. The Matrax™ decoder allows consideration of non-contiguous bi-phrases, where words in the source, target, or both sides can be separated by gaps that have to be filled by other phrases at translation time. A modified version of the Matrax™ was used for performing the present method, which could handle factors on the output side. A restricted part-of-speech set was used as an output factor.

In addition separate preprocessing modules that replace digits and units with placeholders prior to training and translation were employed. These placeholders are replaced after translation by the corresponding digits and units from the source.

The results obtained are shown in Table 5. In both the NIST and BLEU scoring systems, higher scores indicate better translation quality. The following translation models were employed:

(1) a baseline model in which there was no splitting of closed compounds in training stage and no RPOS tags;

(2) a baseline as for (1), except that a conventional part of speech language model with POS tags including noun, verb, adjective, preposition, adverb, etc. was used as described in above-mentioned Koehn 2007;

(3) as for (2), except that closed compounds were split in the training stage, as described in Sara Stymne & Maria Holmqvist (2008) Processing of Swedish Compounds for Phrase-Based Statistical Machine Translation, in Proc. EAMT08, European Machine Translation Conference. Pages 180-189, Hamburg, Germany;

(4) as for (3), but with a restricted POS set (only N, NP, X, <\s> (to denote beginning of sentence) and <\s> (end of sentence)) in place of the conventional POS tagset and using a Language Model, as described in Method 2, Equation 2 above, as one of the feature functions;

(5) closed compounds were split in the training stage. For translation, a Sequence model as described in Method 1 was used, using a punish language model as outlined in, Table 3;

(6) as for (5), but using a boost language model as outlined in Table 2 in place of the punish model;

(7) as for (6), but also using a Language model over the RPOS tagset as for (4) as one of the feature functions.

In each of these methods, all of the other feature functions input to Eqn. 1 were the same. (See for example, Simard, et al., and above-mentioned U.S. Pub. No. 2007/0265825).

TABLE 5

| Translation results | | |
|---|---|---|
| Translation Model | Bleu | NIST |
| 1. Base | 70.91 | 8.8816 |
| 2. Base + POSLM | 72.08 | 8.9173 |
| 3. Split and POSLM | 74.11 | 9.2341 |
| 4. Split and RPOSLM | 74.26 | 9.2767 |

TABLE 5-continued

| Translation results | | |
|---|---|---|
| Translation Model | Bleu | NIST |
| 5. Split and punish model | 73.34 | 9.1543 |
| 6. Split and boost model | 74.96 | 9.3028 |
| 7. Split and RPOSLM + boost model | 74.76 | 9.3368 |

On this dataset, clear improvements were observed in BLEU and NIST scores over the baseline methods for all methods where compounds were split before translation and merged afterwards. Some of the gain is already obtained using a language model on Parts-of-Speech (POSLM). Additional gains can, however, be obtained using solely a language model on a reduced set of POS tags (RPOS), instead of a conventional POS tag set (4) and/or with a count feature explicitly boosting desirable RPOS sequences (6) and (7). In these experiments, the count feature on undesirable sequences (punish) did not bring any improvements. However, it should be noted that neither the NIST nor BLEU scoring systems specifically considers the preference of readers for seeing translations with productive generation of closed compounds in the Danish language. Thus, there may be perceived improvements with using the boost and punish models together (or punish model alone), even though these traditional scoring systems do not recognize them.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A machine translation method for translating source text from a first language to target text in a second language, comprising:

receiving the source text in the first language;

accessing a library of bi-phrases, each of the bi-phrases including a text fragment from the first language and a text fragment from the second language, at least some of the bi-phrases comprising words tagged with restricted part of speech tags, at least one of the restricted part of speech tags configured for identifying a compoundable word from the second language in one of the bi-phrases as being one which also forms a part of a known closed compound word in the second language in another of the bi-phrases, when combined with another compoundable word, wherein:

a first of the restricted part of speech tags identifies a) a compoundable word which appears in a known closed compound word in other than a head position, and a second of the restricted part of speech tags identifies at least one of:

b) a compoundable word which appears in a known closed compound word in the head position, and c) another word, where the compoundable word a), and at least one of the words b) and c) identified by the first and second of the restricted part of speech tags are all a same part of speech;

retrieving text fragments in the second language from the library corresponding to text fragments in the source text;

generating at least one target hypothesis, each of the target hypotheses comprising text fragments selected from the retrieved text fragments in the second language; and evaluating the target hypothesis with a translation scoring function which scores the target hypothesis according to a plurality of feature functions, at least one of the feature functions being based at least in part on a combination of the first and the second of the restricted part of speech tags; and based on the evaluation, outputting one of the at least one target hypothesis as the optimal hypothesis for forming the translation; and wherein at least one of the accessing, retrieving, evaluating and outputting is performed with a computer processor.

2. The method of claim 1, wherein the restricted part of speech tags comprise at least one of the following sets:

a) a first set comprising a first tag (NP) which identifies a word which appears in a known closed noun compound word in other than a head position and a second tag (N) which identifies at least one of a word which appears in a known closed noun compound word in the head position and another noun;

b) a second set comprising a first tag (VP) which identifies a word which appears in a known closed verb compound word in other than a head position and a second tag (V) which identifies at least one of a word which appears in a known closed verb compound word in the head position and another verb;

c) a third set comprising a first tag (AP) which identifies a word which appears in a known closed adjective compound word in other than a head position and a second tag (A) which identifies at least one of a word which appears in a known closed adjective compound word in the head position and another adjective; and d) a fourth set comprising a first tag (AdP) which identifies a word which appears in a known closed adverb compound word in other than a head position and a second tag (Ad) which identifies at least one of a word which appears in a known closed adverb compound word in the head position and another adverb.

3. The method of claim 2, wherein the restricted part of speech tags further comprise at least one of a tag which identifies all other words than those in a selected one of the four sets and a tag which denotes the end of a sentence.

4. The method of claim 2, wherein the evaluation includes counting occurrences of a combination of at least one first tag followed by a second tag of the same set.

5. The method of claim 4, wherein the evaluation further includes counting occurrences of a combination of two first tags of the same set.

6. The method of claim 3, wherein the restricted part of speech tags comprise a tag which denotes the end of a sentence.

7. The method of claim 6, wherein the evaluation includes counting occurrences of a combination of a first tag with the tag which denotes the end of a sentence.

8. The method of claim 1, wherein the only restricted part of speech tags used in the evaluation are:

N, NP, and X, or

N, NP, X, and <\s> where:

N represents a word which appears in a known closed compound word in a head position and all other nouns, NP represents a word which appears in a known closed noun compound word in other than a head position, X represents a word which is not a noun, and <\s> represents the end of a sentence.

9. A machine translation system for translating source text from a first language to target text in a second language, comprising:

memory which stores instructions for performing the method of claim 1; and a processor which executes the instructions.

10. A computer program product comprising a non-transitory recording medium encoding instructions which, when executed by a computer, perform the method of claim 1.

11. A method machine translation method for translating source text from a first language to target text in a second language, comprising:

receiving the source text in the first language;

accessing a library of bi-phrases, each of the bi-phrases including a text fragment from the first language and a text fragment from the second language, at least some of the bi-phrases comprising words tagged with restricted part of speech tags, at least one of the restricted part of speech tags configured for identifying a compoundable word from the second language as being one which also forms a part of a known closed compound word;

retrieving text fragments in the second language from the library corresponding to text fragments in the source text;

generating at least one target hypothesis, each of the target hypotheses comprising text fragments selected from the retrieved text fragments in the second language; and evaluating the target hypothesis based at least in part on combinations of restricted part of speech tags of corresponding compoundable words, comprising:

for each of at least one specified combination of consecutive restricted part of speech tags of corresponding compoundable words from different bi-phrases, identifying occurrences of the specified combination in the hypothesis; and evaluating the target hypothesis with a translation scoring function which scores the target hypothesis according to a plurality of feature functions, at least one of the feature functions taking into account the occurrences of the specified combination of the restricted part of speech tags of the corresponding compoundable words from different bi-phrases in the hypothesis; and based on the evaluation, outputting one of the at least one target hypothesis as the optimal hypothesis for forming the translation; and wherein at least one of the accessing, retrieving, evaluating and outputting is performed with a computer processor.

12. The method of claim 11, wherein a first of the restricted part of speech tags identifies a) a word which appears in a known closed compound word in other than a head position and a second of the restricted part of speech tags identifies at least one of b) a word which appears in a known closed compound word in the head position and c) another word, where the words a), and at least one of b) and c) identified by the first and second tags are all same part of speech.

13. The method of claim 11, wherein the at least one feature function which takes into account the restricted part of speech tags scores the at least one specified combination of the consecutive restricted part of speech tags in the target hypothesis differently from another combination of consecutive restricted part of speech tags.

14. The method of claim 11, wherein at least one feature function is a punish function which penalizes occurrences of at least one specified combination of consecutive restricted part of speech tags which limits generation of a closed compound.

15. The method of claim 14, wherein the punish feature function scores a target hypothesis based on at least one of:
   a) a number of occurrences of a combination NP-X, and
   b) a number of occurrences of a combination NP-<\s>, where:
      NP represents a word which appears in a known closed noun compound word in other than a head position,
      X represents a word which is not a noun, and
      <\s> represents the end of a sentence.

16. The method of claim 11, wherein the translation scoring function comprises a log-linear translation scoring function in which weights are assigned to each of the feature functions and wherein the evaluation of the at least one hypothesis includes selecting a hypothesis from a plurality of hypotheses which optimizes the log-linear translation scoring function.

17. The method of claim 16, wherein the log-linear translation scoring function outputs a probability of a target sentence e and a hidden alignment variable a given a source sentence f of the general form:

$$p(e, a \mid f) = \frac{1}{Z_f} e^{\sum_{i=1}^{n} \lambda_i h_i(e,a,f)} \quad (1)$$

where $h_i$ represents the ith of n feature functions;
$\lambda_i$ represents a weight of $h_i$;
$Z_f$ is a normalization constant; and
wherein at least one of the $h_i$ is a feature $h_b$ which boosts the probability for a hypothesis in which an alignment which permits a closed compound to be formed.

18. The method of claim 16, wherein the translation scoring function outputs a translation for which the log-linear scoring function is optimized.

19. The method of claim 16, wherein one of the feature functions comprises a language model which treats a target hypothesis as a sequence of restricted part of speech tags and computes a probability of the target hypothesis based on the conditional probabilities of subsequences of its restricted part of speech tags, the conditional probabilities being determined for subsequences of a fixed length from a training corpus of text in the second language.

20. A machine translation system for translating source text from a first language to target text in a second language, comprising:
   memory which stores instructions for performing the method of claim 11; and
   a processor which executes the instructions.

21. A computer program product comprising a non-transitory recording medium encoding instructions which, when executed by a computer, perform the method of claim 11.

22. A machine translation method for translating source text from a first language to target text in a second language, comprising:
   receiving the source text in the first language;
   accessing a library of bi-phrases, each of the bi-phrases including a text fragment from the first language and a text fragment from the second language, at least some of the bi-phrases comprising words tagged with restricted part of speech tags, at least one of the restricted part of speech tags configured for identifying a compoundable word from the second language as being one which also forms a part of a known closed compound word;
   retrieving text fragments in the second language from the library corresponding to text fragments in the source text;
   generating at least one target hypothesis, each of the target hypotheses comprising text fragments selected from the retrieved text fragments in the second language; and
   evaluating the target hypothesis based at least in part on specified combinations of restricted part of speech tags, comprising:
      for each of at least one of the specified combinations of the consecutive restricted part of speech tags, identifying occurrences of the specified combination in the hypothesis, each of the occurrences comprising compoundable words, each compoundable word being derived from a different bi-phrase, and computing a score for the hypothesis based on a number of the occurrences of the specified combination in the hypothesis; and
      evaluating the target hypothesis with a translation scoring function which scores the target hypothesis according to a plurality of feature functions, at least one of the feature functions being a boost feature function or a punish feature function,
   the boost feature function favoring occurrences of at least one of the specified combinations of the consecutive restricted part of speech tags which enables generation of a closed compound, the boost feature function scoring a target hypothesis based on:
      a) a number of occurrences of a combination NP-N, and
      b) a number of occurrences of a combination NP-NP; and
   the punish function penalizing occurrences of at least one of the specified combinations of consecutive restricted part of speech tags which limits generation of a closed compound, the punish feature function scoring a target hypothesis based on at least one of:
      a) a number of occurrences of a combination NP-X, and
      b) a number of occurrences of a combination NP-<\s>,
      where:
         NP represents a word which appears in a known closed noun compound word in other than a head position,
         N represents at least one of a word which appears in a known closed noun compound word in the head position and another noun;
         X represents a word which is not a noun, and <\s> represents the end of a sentence; and
   based on the evaluation, outputting one of the at least one target hypothesis as the optimal hypothesis for forming the translation; and
   wherein at least one of the accessing, retrieving, evaluating and outputting is performed with a computer processor.

23. A machine translation method for translating source text from a first language to target text in a second language, comprising:
   receiving the source text in the first language;
   accessing a library of bi-phrases, each of the bi-phrases including a text fragment from the first language and a text fragment from the second language, at least some of the bi-phrases being tagged with restricted part of speech tags, the restricted part of speech tags including an NP tag which identifies a text fragment from the second language as being one which also forms a part of a known closed noun compound word other than in a head position of the closed noun compound word and an N tag which identifies at least one of a text fragment which appears in a closed noun compound word in the head position and another noun;

retrieving text fragments from the second language from the library corresponding to text fragments in the source text;

generating at least one target hypothesis, each of said target hypotheses comprising text fragments selected from the second language; and evaluating the target hypothesis based at least in part on combinations of restricted part of speech tags, the evaluating including at least one of:

a) counting at least one of i) occurrences of combinations of NP-N and NP-NP which favor formation of closed compound words and ii) occurrences of NP immediately followed by a restricted part of speech tag other than N or NP, which disfavor formation of closed compound words, and b) retrieving conditional probabilities of occurrence for subsequences of the restricted part of speech tags in the target hypothesis counted in a) and computing a combined probability based thereon; and based on the evaluation, outputting one of the at least one target hypothesis as the optimal hypothesis for forming the translation.

* * * * *